United States Patent [19]
Susnjara et al.

[11] Patent Number: 5,305,525
[45] Date of Patent: Apr. 26, 1994

[54] SPINDLE ASSEMBLY FOR MACHINE TOOLS AND METHOD OF FABRICATING SAME

[75] Inventors: Kenneth J. Susnjara, Santa Claus; Kenneth L. Gwin, Dale; David A. Stutsman, Huntingburg, all of Ind.

[73] Assignee: Thermwood Corporation, Dale, Ind.

[21] Appl. No.: 821,831

[22] Filed: Dec. 2, 1991

Related U.S. Application Data
[63] Continuation of Ser. No. 578,488, Aug. 24, 1990, abandoned.

[51] Int. Cl.⁵ .............................................. B23Q 3/00
[52] U.S. Cl. .................................. 29/898.07; 384/537; 384/585; 409/231
[58] Field of Search ............... 409/231, 232, 233, 131; 384/537, 584; 29/898.07; 408/708

[56] References Cited

U.S. PATENT DOCUMENTS
| | | | |
|---|---|---|---|
| 3,299,778 | 1/1967 | Amacher | 409/232 |
| 3,765,787 | 10/1973 | Hart et al. | 409/231 |
| 4,452,654 | 6/1984 | Ka Dell, Jr. | 156/91 |
| 4,810,108 | 3/1989 | Yajima | 384/488 |
| 4,854,750 | 8/1989 | Lavin | 384/500 |

FOREIGN PATENT DOCUMENTS
| | | | |
|---|---|---|---|
| 232847 | 11/1985 | Japan | 409/231 |
| 706204 | 1/1980 | U.S.S.R. | 409/231 |

Primary Examiner—Daniel W. Howell
Attorney, Agent, or Firm—Lalos & Keegan

[57] ABSTRACT

A spindle assembly for a machine tool generally consisting of a housing, a housing having a pair of bearing seats, roller bearings mounted in the bearing seats, the bearing seats being oversized relative to the outer races of the roller bearings, the outer races of the roller bearings being adhesively bonded to the housing in said bearing seats and a spindle mounted in the inner races of the roller bearings.

25 Claims, 1 Drawing Sheet

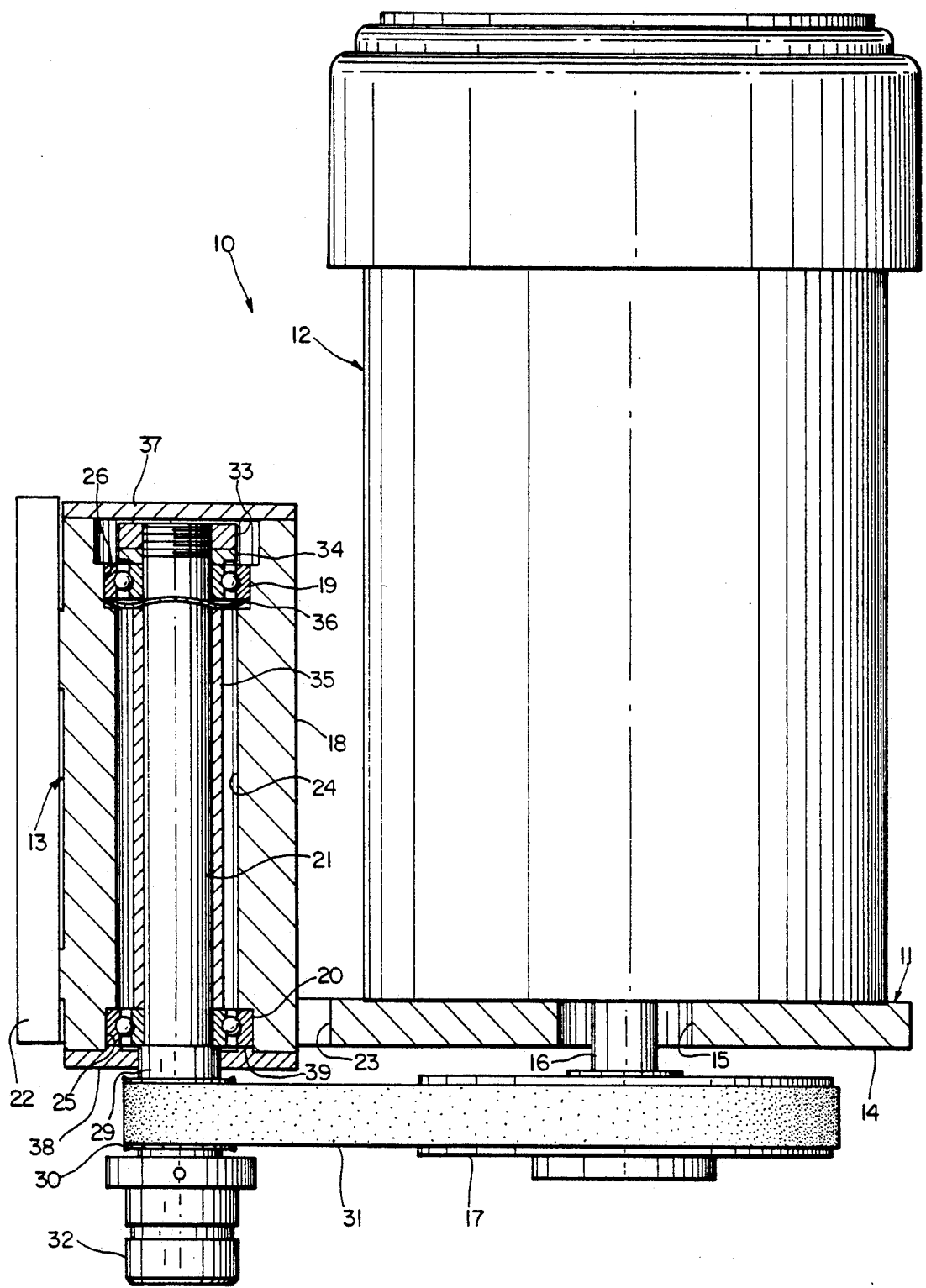

SPINDLE ASSEMBLY FOR MACHINE TOOLS AND METHOD OF FABRICATING SAME

This is a continuation of copending application(s) Ser. No. 07/578,488 filed on Aug. 24, 1990 now abandoned.

This invention relates to an improved spindle assembly for machine tools and also to a novel method of fabricating such an assembly.

In computer controlled machine tools of the type including a base, a table mounted on the base for supporting one or more workpieces, a gantry mounted on the base and displaceable along an x-axis, a tool support mounted on the gantry and displaceable along a y-axis and a tool holder mounted on the tool support and displaceable along the z-axis, there typically is provided a motor driven spindle assembly which holds and rotates a cutting tool such as a router, drill and the like. Generally, the spindle assembly includes a housing mounted on the tool support, a set of spaced, axially aligned roller bearings mounted in bearing seats provided in the housing and a spindle mounted in the bearings which holds a tool bit and is drivingly connected to an AC electric motor.

In the prior art, it has been the conventional practice to fabricate such spindle assemblies by providing a cast housing, machining a longitudinal bore in the cast housing, machining the bearing seats and then assembling the bearings and spindle. In assembling the unit, the lower bearing usually is press-fitted onto the lower end of the spindle, the spindle is inserted into the lower end of the housing bore and the lower bearing is press-fitted into the lower bearing seat, and the upper bearing is press-fitted onto the upper end of the spindle and into the upper bearing seat.

Because of the high speed operation of the spindle, i.e., up to 20,000 rpm, the bearings must be accurately, axially aligned and the bearing seats must be concentric. Otherwise, laterally directed loads produced by the high speed rotation of the spindle will create an axis of inertia that is not parallel to the axis of rotation and this will result in undue wear of the bearing seats, the bearing roller balls, the spindle or combinations of such components, and malfunction or premature failure of the assembly.

In machining the bearing seats in the housing of such assemblies, the housing commonly is placed in a lathe or turning center and a first bearing seat is cut and then ground to a precise dimension. The housing is then removed from the machine, turned 180° and then replaced in the machine. The other bearing seat is then cut and ground.

In machining the bearing seats as described, it has been found that due to the removal and replacement of the housings in the lathe or turning center, any misplacement of the housing in the machine results in an axial misalignment or an eccentricity of the bearing seats. As previously mentioned, such misalignment or eccentricity further results in the development of laterally directed loads during operation of the spindle which ultimately results in a malfunction or failure of the spindle assembly. It thus has been found to be desirable to provide a spindle assembly for a machine tool in which the unit ma be expeditiously and economically fabricated with the bearings axially aligned or concentric to prevent the malfunctioning or premature failure of the assembly.

Accordingly, it is the principal object of the present invention to provide an improved spindle assembly.

Another object of the present invention is to provide an improved spindle assembly for a machine tool adapted to hold and rotate a tool bit.

A further object of the present invention is to provide an improved spindle assembly generally consisting of a housing, a set of bearings mounted in the housing and a spindle mounted in the bearings in which malfunctioning or premature failure of any of the components thereof is prevented during the normal service life of the assembly.

A still further object of the present invention is to provide an improved spindle assembly for a machine tool generally consisting of a housing, a set of bearings mounted in the housing and a shaft mounted in the bearings in which undue lateral loads develop during high speed rotation of the spindle are prevented.

Another object of the present invention is to provide an improved spindle assembly for a machine tool generally consisting of a housing, a set of bearings mounted in the housing and a spindle mounted in the bearings in which the bearings are axially aligned or concentric thus minimizing undue lateral loads developed during high speed rotation of the spindle.

A further object of the present invention is to provide a novel method of fabricating a spindle assembly for a machine tool.

A still further object of the present invention is to provide a novel method of fabricating a spindle assembly for a machine tool generally consisting of a housing, a set of bearings mounted in the housing and spindle mounted in the bearings in which axial alignment or concentricity of the bearings is assured.

Another object of the present invention is to provide a novel method of fabricating a spindle assembly for a machine tool consisting of a housing, a set of bearings mounted in the housing and a spindle mounted in the bearings which not only assures axial alignment or concentricity of the bearings but is more expeditious and economical relative to prior art fabricating methods.

Other objects and advantages of the present invention will become more apparent to those persons having ordinary skill in the art to which the present invention pertains from the following description taken in conjunction with the accompanying drawing.

BRIEF DESCRIPTION OF THE DRAWING

FIG. 1 is a vertical cross-sectional view of a preferred embodiment of the present invention.

DETAILED DESCRIPTION OF THE PREFERRED EMBODIMENTS

Referring to the drawing, there is illustrated a tool head 10 generally consisting of a support frame 11 adapted to be mounted on a machine tool, an electric motor 12 rigidly mounted on the support frame and a spindle assembly 13 also rigidly mounted on the support frame and drivingly connected to the servo motor. The motor is mounted on a plate 14 of the support frame which is provided with an opening 15 for receiving therethrough a drive shaft 16 of the motor. Mounted on the free end of the drive shaft is a drive pulley 17.

Spindle assembly 13 generally consists of a housing 18, a pair of upper and lower roller bearings 19 and 20 mounted on the housing and a spindle 21 mounted in the bearings. The housing is rigidly secured to an end plate 22 of the support frame and extends through an opening 23 in motor mounting plate 14. The housing is provided with a vertically disposed, longitudinal bore 24 provided with an enlarged section at the lower end thereof defining a lower bearing seat 25 and an enlarged section at the upper end thereof defining an upper bearing seat 26. Mounted in bearing seats 25 and 26 are roller bearings 19 and 20. The diameters of bearing seats 25 and 26 are slightly oversized relative to the outside diameters of bearings 19 and 20, and the bearings are secured to the housing within their respective bearing seats by an adhesive bonding material.

Spindle 21 is press-fitted within the inner races of bearings 19 and 20 and is provided with a enlarged section 29 which engages the inner race of lower bearing 20 and extends below the spindle housing. Mounted on the projecting portion of the spindle is a pulley 30 aligned with pulley 17 for receiving a drive belt 31, and a collet 32 for holding a tool bit such as a router or a drill in the conventional manner. The upper end of the spindle is threaded to receive a lock nut 33 which bears on a wavy washer 34 seated on the inner race of bearing 26 to preload the bearing. A spacer tube 35 is provided between the inner races of the bearings, and a wave washer 36 is provided between the outer race of bearing 19 and the annular land portion of bearing seat 26. The upper and lower ends of the housing are closed by an upper cover plate 37 secured to the housing with a set of screws, and a lower cover plate 38 also secured to the housing by means of a set of screws. Lower cover plate 38 further is provided with an annular projecting portion 39 which engages the outer race of lower bearing 20.

In the fabrication and assembly of the spindle assembly, the housing is first formed by machining bore 24 and bearing seats 26 and 25. Since bore 24 functions merely to accommodate the spindle and spacer tube within the housing, no close dimensional tolerance is required to be held in machining the bore. In machining the bearing seats, no close dimensional tolerance also need be held and such seats are machined to a diameter slightly greater, approximately 0.015 inches, than the outside diameters of the bearings.

The bearings are inserted in the housing by first press-fitting lower bearing 20 on the lower end of spindle 21. Bearing seat 25 and bearing 20 are then cleaned and a metal-to-metal adhesive bonding material is applied to such cleaned surfaces. The spindle next is inserted into the housing so that the lower bearing is seated in the lower bearing seat. With the lower bearing and spindle thus mounted in the housing, the spacer tube is inserted in the bore about the spindle and seated on the inner race of lower bearing 20, and wave spring 36 is inserted in upper bearing seat 26. The mating surfaces of bearing seat 26 and upper bearing 28 are then cleaned and a metal-to-metal adhesive bonding material is applied to the cleaned mating surfaces of the bearing and bearing seat. The upper bearing is then press-fitted onto the upper end of the spindle and inserted in bearing seat 26 so that the inner race of the bearing engages the upper end of the spacer tube and the outer race engages the wave spring. Washer 34 is then placed on the free end of the spindle and lock nut 33 is applied. Finally, upper and lower cover plates 37 and 38 are mounted to close the upper and lower ends of the housing. The assembly is then permitted to stand for several hours to permit the adhesive bonding material to cure and rigidly secure the outer races of the bearings to the housing.

It will be appreciated that with the spindle journals being machined to precision tolerances relative to the bearing inner dimensions and the bearings thus being properly oriented relative to the shaft, the adhesive bonding material will fill the spaces between the outer races of the bearings and the housing to maintain the axial alignment or concentricity of the bearings relative to each other and the shaft while rigidly securing the outer races of the bearings to the housing. The components of the spindle assembly thus are properly aligned and balanced to eliminate any undue laterally directed loads tending to cause undue wear on the bearing seats, the balls of the roller bearings or the spindle journals. The assembly method as described permits the bearings and shaft to be properly aligned axially and maintained in such proper alignment for the service life of the assembly.

Any suitable metal-to-metal adhesive bonding material such as an epoxy-resin adhesive can be used within the scope of the present invention. It has been found that a metal-to-metal adhesive bonding material manufactured and sold by the Loctite Corporation of Newington, Conn. under the trademark QUICK METAL is particularly suitable for the present application. It further has been found that prior to the application of the adhesive bonding material that the bonding surfaces may be cleaned by any suitable solvent to remove any grease or other contaminants that may inhibit adhesion.

In forming the bearing seats, it is necessary only to oversize the seats a small amount. In this regard, it has been found that to accommodate a bearing having an outside diameter of 2.4409 inches, the bearing seat may be turned to 2.4560 inches, providing a clearance of 0.015 inches to be filled by the adhesive bonding material.

It thus will be seen that with the proposed assembly procedure, precise machining and axial alignment of the bearing seats is eliminated while assuring precise alignment of the bearings relative to each other and the spindle. Accordingly, undue wear on the bearing seats, the balls of the roller bearings and the spindle journals is eliminated thus eliminating malfunction and premature failure of the spindle assembly.

From the foregoing detailed description, it will be evident that there are a number of changes, adaptations, and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A method of fabricating a high speed spindle assembly for a machine tool, including a housing, at least two bearings seated in said housing and a spindle mounted in said bearings, comprising:
    forming a pair of bearing seats in said housing slightly oversized relative to the outer dimensions of said bearings;
    mounting a first bearing on said spindle;
    inserting said spindle in said housing while adhesively bonding said first bearing in a first oversized bearing seat; and
    mounting a second bearing on said spindle while adhesively bonding said second bearing in a second oversized bearing seat whereby upon setting of the adhesive bonding between the bearings and the housing said bearings will be axially aligned and maintained in axial alignment.

2. A method according to claim 1 wherein said first bearing is press-fitted onto said spindle.

3. A method according to claim 1 wherein said second bearing is press-fitted onto said spindle.

4. A method according to claim 1 wherein said bearings are bonded to said housing with a metal-to-metal adhesive bonding material.

5. A method according to claim 1 wherein said first and second bearings each includes an inner race and an outer race and including a step of providing a spacer tube on said spindle prior to mounting said second bearing on said spindle to provide a fixed spacing between the inner races of the bearings.

6. A method according to claim 5 including providing a lock nut on said spindle for securing the inner race of said second bearing between said nut and said spacer tube.

7. A method according to claim 6 including providing a wavy washer between said housing and the outer race of said second bearing to preload the bearing.

8. A method according to claim 1 wherein said bearing seats are oversized by approximately 0.015 inches relative to said bearings.

9. A method according to claim 8 wherein said bearing seats are formed by machining.

10. A method of fabricating a high speed spindle assembly for a machine tool, including a housing having a longitudinal bore, at least two roller bearings each including inner and outer races seated in said housing and a spindle mounted in said bearings, comprising:

machining a pair of outwardly opening bearing seats in said housing at the ends of said bore, slightly oversized relative to the outer diameters of the outer races of said bearings;

press-fitted a first bearing on one end of said spindle;

applying an adhesive bonding material to the first bearing seat and the outer race of said first bearing;

inserting said spindle in said housing bore and seating said first bearing in said first bearing seat;

applying an adhesive bonding material to the second bearing seat and the outer race of said second bearing;

press-fitting said second bearing onto the free end of said spindle while inserting said second bearing in said second bearing seat; and allowing said bonding material to set whereby said bearings will be aligned axially.

11. A method according to claim 10 wherein said bearings are bonded to said housing with a metal-to-metal adhesive bonding material.

12. A method according to claim 10 wherein said bearing seats are oversized by 0.015 inches relative to the diameters of the outer races of said bearings.

13. A method according to claim 11 including providing a spacer tube on said spindle between the inner races of said bearings.

14. A method according to claim 13 including providing a lock nut on said spindle for securing the inner race of said second bearing between said nut and said spacer tube.

15. A method according to claim 13 including providing a wavy washer between said housing and the outer race of said second bearing to preload said bearing.

16. A high speed spindle assembly for a machine tool comprising:

a housing;

said housing having a pair of bearing seats;

roller bearings including inner and outer races mounted in said bearing seats;

said bearing seats being oversized relative to the outer races of said roller bearings;

said outer races of said roller bearings being adhesively bonded to said housing in said bearing seats; and a spindle mounted in the inner races of said roller bearings;

whereupon said bearings will be axially aligned and maintained in axial alignment.

17. A spindle assembly according to claim 16 wherein the outer races of said bearings are bonded to said housing by means of a metal-to-metal adhesive bonding material.

18. A spindle assembly according to claim 16 wherein said bearing seats are oversized approximately 0.015 inches relative to the outer diameters of the outer races of said bearings.

19. A spindle assembly according to claim 16 including a spacer tube disposed between the inner races of said bearings.

20. A spindle assembly according to claim 16 wherein the inner races of said bearings are press-fitted onto said spindle.

21. A spindle assembly according to claim 19 including a lock nut threaded on a threaded end of said spindle for securing the inner race of one of said bearings between said nut and said spacer tube.

22. A spindle assembly according to claim 21 including a wavy washer disposed between said housing and an outer race of one of said bearings to preload said bearing.

23. A spindle assembly according to claim 16 including pulley mounted on said spindle.

24. A spindle assembly according to claim 16 including a tool holding means mounted on said spindle.

25. A method according to claim 1 wherein said bearings are bonded to said housing with an epoxy-resin adhesive.

* * * * *

UNITED STATES PATENT AND TRADEMARK OFFICE
CERTIFICATE OF CORRECTION

PATENT NO. : 5,305,525
DATED : April 26, 1994
INVENTOR(S) : Kenneth J. Susnjara et al It is certified that error appears in the above-indentified patent and that said Letters Patent is hereby corrected as shown below:

Claim 10, column 5, line 37, delete "press-fitted" and insert therefor --press-fitting--.

Signed and Sealed this

Twenty-second Day of November, 1994

Attest:

BRUCE LEHMAN

Attesting Officer     Commissioner of Patents and Trademarks